US010833838B1

(12) United States Patent
Descamps et al.

(10) Patent No.: US 10,833,838 B1
(45) Date of Patent: Nov. 10, 2020

(54) PRECISE TIME SYNCHRONIZATION FOR COMMUNICATION DEVICES IN NETWORKS

(71) Applicant: Itron Global SARL, Liberty Lake, WA (US)

(72) Inventors: Guillaume Descamps, Paris (FR); Lionel Auzereau, Le Plessis Robinson (FR); Philippe Chiummiento, Fontenay-aux-Roses (FR)

(73) Assignee: Itron Global SARL, Liberty Lake, WA (US)

( * ) Notice: Subject to any disclaimer, the term of this patent is extended or adjusted under 35 U.S.C. 154(b) by 0 days.

(21) Appl. No.: 16/523,680

(22) Filed: Jul. 26, 2019

(51) Int. Cl.
*H04J 3/06* (2006.01)
*H04L 7/00* (2006.01)

(52) U.S. Cl.
CPC .......... *H04L 7/0041* (2013.01); *H04L 7/0054* (2013.01)

(58) Field of Classification Search
CPC .................. H04L 7/0041; H04L 7/0054
USPC ..................... 370/503–520; 375/353–370
See application file for complete search history.

(56) References Cited

U.S. PATENT DOCUMENTS

| | | | | |
|---|---|---|---|---|
| 6,356,555 B1 * | 3/2002 | Rakib | .................. | H03M 13/256 370/441 |
| 7,688,904 B2 * | 3/2010 | Yonge, III | .......... | H04L 27/2608 375/260 |
| 8,369,235 B2 * | 2/2013 | Kim | ....................... | H04W 24/08 370/252 |
| 8,717,972 B2 * | 5/2014 | Cheng | ............... | H04W 56/0045 370/324 |
| 9,042,352 B2 * | 5/2015 | Bahr | ..................... | H04W 74/02 370/336 |
| 2009/0304128 A1 * | 12/2009 | Izumi | ..................... | H04L 7/042 375/343 |
| 2010/0165942 A1 * | 7/2010 | Liao | .................. | H04W 56/0015 370/329 |
| 2010/0329231 A1 * | 12/2010 | Sekiya | .............. | H04W 72/1215 370/345 |
| 2017/0078054 A1 * | 3/2017 | Hadani | ................... | H04L 5/003 |
| 2017/0331577 A1 * | 11/2017 | Parkvall | ............... | H04L 5/1469 |
| 2019/0014592 A1 * | 1/2019 | Hampel | .............. | H04W 56/001 |
| 2019/0364492 A1 * | 11/2019 | Azizi | .................. | H04W 92/045 |

* cited by examiner

*Primary Examiner* — Thai D Hoang
(74) *Attorney, Agent, or Firm* — Lee & Hayes, P.C.

(57) ABSTRACT

Techniques for employing precise transmission capabilities of a physical (PHY) layer to transmit time-synchronization beacons at an edge-of-field-resolution increment of a field of MAC layer frame. In some examples, the PHY layer may transmit beacons with a greater precision than permitted by lower-resolution MAC layer header fields. The communication protocol may specify the size of the field that is populated with timing information at a first precision. However, the PHY layer may be capable of transmitting with a second precision that is greater than the first precision. Thus, to virtually increase the time-synchronization resolution of the beacons, the beacons may be transmitted by the PHY layer at an edge-of-field resolution of the MAC layer header field. In this way, the first precision of the timing information in the MAC layer header field is virtually increased to the second precision of the PHY layer.

20 Claims, 6 Drawing Sheets

US 10,833,838 B1

PRECISE TIME SYNCHRONIZATION FOR COMMUNICATION DEVICES IN NETWORKS

BACKGROUND

Communication networks, such as wireless and/or wired mesh networks, star networks, and so on, are used to connect a variety of different devices. These communication networks often contain devices having different characteristics and capabilities. To enable communication between devices, communication networks are generally governed by open industry standards which define guidelines, or protocols, that specify how network devices communicate. For example, network devices may be required to periodically transmit and/or receive certain types of data. In order to efficiently and effectively exchange data on a communication network, the devices in the network may need to access the communication medium (e.g., wired and/or wireless) at predefined times to transmit data, or "listen" for and receive data. While the communication protocol may specify the windows of time in which devices are to communicate data, the internal clocks in the devices need to be accurately synchronized to ensure that they transmit or receive data at the appropriate time slots.

Time synchronization for many communication networks may be performed using time-synchronization beacons that carry timing information between devices in order to synchronize the clocks of the devices. For example, the beacons can include a media access control (MAC) layer header field that is populated with timing information such that devices that receive beacons rely on the MAC layer header field, correlated with a time of reception, to compare and adjust their internal clocks. However, various factors can reduce the accuracy of the time synchronization between the devices, which in turns results in network inefficiencies.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
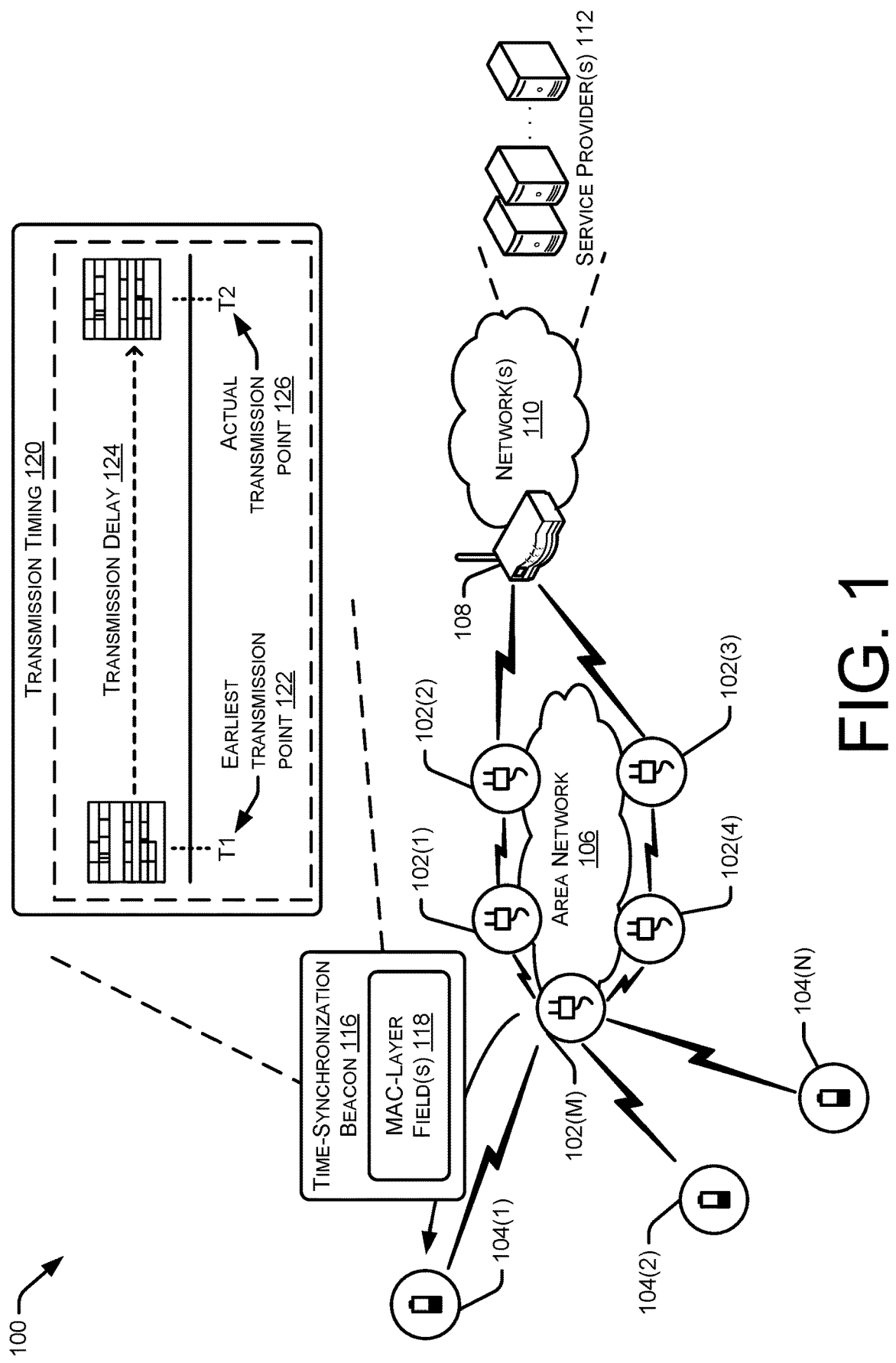
FIG. 1 illustrates a schematic diagram of an example network architecture in which communication devices synchronize internal clocks using time-synchronization beacons.

As discussed above, communication networks may be governed by standards or protocols which specify communication requirements for network devices. To ensure that the network devices access the communication medium efficiently, such as by jumping radio frequency (RF) channels to transmit data and/or switching on their receivers in time to receive data according to the protocol, the devices may periodically transmit time-synchronization beacons to synchronize their internal clocks. The beacons can include a media access control (MAC) layer header field that is populated with timing information such that devices that receive beacons use the MAC layer header field, correlated with a time of reception, to compare and adjust their internal clocks. Thus, time synchronization between the devices may be limited based on the resolution or precision of the timing information that is populated in the MAC layer field (and/or fields in other layers that are higher than the physical layer). Further, time synchronization may be limited based on the indeterministic processing latency of software-defined radio physical layers. For example, the communication protocol that specifies the size of the field that is populated with the timing information for an internal clock of a device may allow for the timing information to specify a time with a resolution of 100 microseconds (µs). As another example, heavy processing at the physical layer such as forward error correction (FEC) (e.g., Reed-Solomon codes, Viterbi algorithm. etc.), interleaving, and/or interpolation may lead to indeterministic physical layer processing depending on the processing load and the million instructions per second (MIPS) performance of the processor. This heavy processing at the physical layer may lead to non-negligible variation against the resolution of the time information.

To achieve better accuracy in the timing information would require a more precise MAC layer field, implying more bits in the header which consumes more energy, and also would require an impermissible protocol compatibility break. However, if devices in a communication network are able to synchronize with a higher precision than, for example, 100 µs, various efficiencies may be gained. For instance, as the precision of the timing information increases for device synchronization, the devices may be able to shorten listening windows, which can increase battery life of battery-powered devices and reduce network bandwidth requirements for the protocol. Accordingly, it is advantageous to increase precision or resolution of timing information for device synchronization, but disadvantageous (and/or impermissible by a protocol) to increase the bits in a field of a time-synchronization beacon to increase the precision of the timing information.

This disclosure describes techniques directed to using a physical (PHY) layer to transmit time-synchronization beacons at a more precise time using an edge-of-field-resolution increment of a field of MAC layer frame of the beacon. In some examples, the PHY layer may be capable of transmitting beacons with a greater resolution or precision than permitted by the lower-resolution MAC layer header fields. As a specific example, the communication protocol that specifies the size of the MAC field that is populated with timing information may allow for the timing information to be specified with a resolution of 100 µs. However, the PHY layer may be capable of transmitting with a higher resolution or precision, and/or with a predictable delay, such as in the range of 1-10 µs. Thus, in order to virtually increase the time-synchronization precision of the beacons, the techniques described herein include causing the beacons to be transmitted by the PHY layer at an edge-of-field resolution of the MAC layer header field. In this way, the 100 µs resolution of the timing information in the MAC layer header fields is transmitted by the PHY layer within 1-10 μs of increment of time indicated in the MAC layer header field.

In an illustrative example, a device in a communications network may determine to transmit a time-synchronization beacon to a neighboring device to synchronize internal clocks according to a communication protocol. Traditionally, the device may simply identify a future time at which the packet will have finished being built and is prepared to be transmitted. When building the packet, the device would determine the timing information populate the field of the MAC layer header using that future time. For example, the device may determine that it is capable of transmitting the beacon within a 300-400 μs time slot, such as at 355 μs. However, because the field of the MAC layer header allows for timing information of up to 100 μs of resolution, the field of the MAC layer header may simply indicate resolution of 300 μs without indicating the additional precision for the 55 μs.

According to the techniques described herein, the device may instead determine to delay transmission of the beacon until the edge-of-field increment, or 400 μs in this example. The device may then populate the field of the MAC layer header with timing information that indicates a resolution of 400 μs. The device may then instruct the PHY layer to delay transmission of the beacon such that the PHY layer transmits the beacon at 400 μs. As noted above, the PHY layer may transmit with a higher precision or resolution, such as an accuracy of 1 μs. Accordingly, the PHY layer may transmit the beacon in a range of 399 μs to 401 μs, and the field of the MAC layer header may be populated with timing information that indicates 400 μs. Thus, the receiving devices may receive the beacon with the timing information of 400 μs, and rather than the 400 μs being inaccurate by potentially up to 99 μs due the lower-resolution field of the MAC layer header, the 400 μs is only inaccurate by up to 1 μs due to the accuracy provided by the PHY layer.

In this way, the precision of the PHY layer for transmitting beacons may be utilized to virtually increase the accuracy (e.g., precision, resolution, etc.) of the field of the MAC layer header. In turn, the timing information communicated between devices using time-synchronization beacons in a communication network may more accurately reflect a time of the internal clock that transmitted/sent the time-synchronization beacon, resulting in devices on a communication network having their internal clocks more accurately synchronized.

The techniques described herein increase the precision and/or accuracy at which internal clocks of devices in a communications network are synchronized with each other. Further, the internal clocks of devices in the network are able to increase the resolution at which their clocks are synchronized, while still complying with communication protocols for the frames and packets for the time-synchronization beacons. For instance, a MAC layer header field (or any other field of a frame) may comply with protocol that specifies how many bits are utilized to specify the time information for the beacon, but the time information may indicate the times of the internal clocks with greater resolution or accuracy than provided by the bits of the field. By synchronizing the internal clocks of devices more closely, the techniques described herein allow devices to have shorter listening windows because there is less clock drift between the devices, which in turn increases battery life of devices (or otherwise reduces power consumption for receivers/transmitters), and reduces network congestion. Accordingly, the techniques described herein improve the performance of devices in a communication network in various ways.

Although the techniques are described with reference to various resolution or precision with respect to timing information, the techniques are generally applicable for any device that has MAC layer timing information specified with less resolution than the precision at which the PHY layer can transmit a beacon. Additionally, the techniques are described as being performed by a MAC layer and a PHY layer, but the techniques are equally as applicable to any type layer(s) defined by any communication model. The techniques may be applied in wired networks, wireless networks, mesh networks, start networks, and/or any combination thereof.

Further, the techniques described herein are generally applicable to any network standard or protocol that have been implemented for different types of networks. Numerous standards alliances, groups, or organizations (e.g., Internet Protocol for Smart Objects (IPSO) Alliance, Institute for Electrical and Electronic Engineers (IEEE), Internet Engineering Task Force (IETF), Wi-SUN Alliance, etc.) have been organized to develop and promote voluntary network standards and protocols, such as Internet standards and protocols. The techniques described herein are generally applicable for any standard or protocol defined by the above-noted organizations, and/or any other network standard or protocol.

In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management, or any other type of wireless or wired network. Unless specifically described to the contrary, the techniques described herein are applicable to any communications network, control network, and/or another type of network or system. In one example, the techniques may be implemented in the context of the Internet of Things (IoT).

By way of example and not limitation, network communication devices (sometimes referred to as communication devices, nodes, computing devices, or just devices) include utility meters (e.g., electricity, water, or gas meters), relays, repeaters, routers, transformers, sensors, switches, encoder/receiver/transmitters (ERTs), appliances, personal computers (e.g., desktop computers, laptop computers, etc.), mobile devices (e.g., smartphones, tablets, personal digital assistants (PDAs), electronic reader devices, etc.), wearable computers (e.g., smart watches, optical head-mounted displays (OHMDs), etc.), servers, access points, portable navigation devices, portable gaming devices, portable media players, televisions, set-top boxes, computer systems in an automobile (e.g., navigation systems), cameras, robots, hologram systems, security systems, home-based computer systems (e.g., intercom systems, home media systems, etc.), projectors, automated teller machines (ATMs), and so on. In some instances, a network communication device may comprise a battery powered network communication device (also referred to as a "battery powered device") that relies on a battery for power (i.e., is not connected to mains power). In other instances, a network communication device (also referred to as a "mains powered device") may comprise a mains powered device that relies on mains power for electricity.

FIG. 1 illustrates a schematic diagram of an example network architecture 100 in which communication devices 102 and/or 104 synchronize internal clocks using time-synchronization beacons.

FIG. 1 is a diagram illustrating an example networked environment or architecture 100. The architecture 100 includes multiple network communication devices. The network communication devices include mains powered devices (MPD) 102(1), 102(2), 102(3), 102(4), . . . 102(M) (collectively referred to as "MPDs 102"), and battery powered devices (BPDs) 104(1), 104(2), . . . 104(N) (collectively referred to as "BPDs 104"), where M and N are any integers greater than or equal to 1 and may be the same number or different numbers. In some illustrations, the MPDs 102 include more functionality/resources than the BPDs 104. In one example, the MPDs 102 are connected to mains electricity (e.g., electricity meters), while the BPDs 104 are not connected to mains electricity (e.g., water meters, gas meters, etc. that employ batteries). In other examples, the MPDs 102 and BPDs 104 may have different processing power, processing capabilities, and so on. The techniques discussed herein may be implemented to communicate between MPDs 102, BPDs 104, or any combination of devices.

The network communication devices are in communication with one another via an area network (AN) 106. As used herein, the term "area network" refers to a defined group of devices that are in communication with one another via one or more wired and/or wireless links. Examples of area networks include, for example, local area networks (LANs), neighborhood area networks (NANs), personal area networks (PANs), home area networks (HANs), Field Area Networks (FANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels. In some examples, a link may be a physical medium, such as a power line, cable line, and/or any other physical communication medium.

The AN 106 may comprise a mesh network, in which the network communication devices relay data through the AN 106. Alternatively, or additionally, the area network 106 may comprise a star network, in which a central device acts as a parent to one or more children devices. For example, the MPD 102(M) may act as a parent to the BPDs 104(1), 104(2), and 104(N). Further, in some instances the AN 106 may include a portion that is implemented as a mesh network and a portion that is implemented as a star network. Moreover, in other instances the AN 106 may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In many examples, the BPDs 104 are implemented as leaf nodes. A leaf node may generally communicate with a parent node and not relay data for another node. As illustrated in FIG. 1, the BPDs 104(1) and 104(2) act as leaf nodes, with the MPD 102(M) being the parent node. Further, any type of device may be implemented as a leaf node (e.g., any of the MPDs 102).

The network communication devices also include an edge device 108, which serves as a connection point of the AN 106 to one or more networks 110 (e.g., a backhaul network), such as the Internet. The edge device 108 may include, but is not limited to, a field area router (FAR), a cellular relay, a cellular router, an edge router, a DODAG (Destination Oriented Directed Acyclic Graph) root, a root device or node of the AN 106, a combination of the foregoing, or the like. In this illustrated example, the edge device 108 comprises a DODAG root, which relays communions from the AN 106 to one or more service providers 112 via the network(s) 110. Thus, the edge device 108 will be referred to as DODAG root 108 moving forward, but may comprise any type of edge device depending on the network and network topology.

In some instances, the one or more service providers 112 comprise one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. The network communication devices may register or interact with some or all of these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionalities. In other instances, the one or more service providers 112 comprise other systems to implement other functionality, such as web services, cloud services, and so on. In yet other instances, the one or more service providers 112 may be implemented as other types of devices, such as in the context of the Internet of Things (IoT) that allows a variety of devices to exchange data.

The one or more service providers 112 may be physically located in a single central location, or may be distributed at multiple different locations. The one or more service providers 112 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

In some examples, the communication devices 102/104 may be governed by standards or protocols which specify communication requirements for the devices 102/104. To ensure that the communication devices 102/104 access the communication medium (e.g., AN 106, network(s) 110, etc.) efficiently, such as by jumping radio frequency (RF) channels to transmit data and/or switching on their receivers in time to receive data according to the protocol, the communication devices 102/104 may periodically transmit time-synchronization beacons 116 to synchronize their internal clocks. For example, a communication device 102 may transmit a time-synchronization beacon 116 to another communication device 104 in the AN 106 to indicate a time shown by the internal clock of the device 102 so that the device 104 can synchronize its internal clock with the device 102. In some examples, such as a mesh network, the devices 102/104 may send time-synchronization beacons 116 to neighboring devices 102/104 periodically to synchronize internal clocks of all the communication devices 102/104 in the AN 106. The communication protocol that governs communications of the devices 102/104 may specify a frequency at which the devices 102/104 are to send the time-synchronization beacons 116 and synchronize internal clocks, or a schedule of when the devices 102/104 are to send the time-synchronization beacons 116.

In some examples, the time-synchronization beacons 116 may include one or more MAC-layer fields 118 that include time-synchronization data that indicates a time of an internal clock for the device 102/104 that is transmitting/sending the time-synchronization beacon 116. For example, the devices 102/104 may be configured to populate the MAC-layer field(s) 118 based on a time shown by the internal clocks. In some example, the devices 102/104 may transmit the time-synchronization beacons 116 after receiving a time-synchronization beacons 116 and updating their internal clock based on the timing information included in the received time-synchronization beacons 116.

The devices 102/104 may generate, build, or otherwise prepare a time-synchronization beacons 116 to be sent/transmitted to another device 102/104. The size of, or the number of bits allowed to be populated into the, MAC-layer field(s) 118 may be restricted by the governing communication protocol such that the MAC-layer field(s) 118 are only able to include timing information that represent a time on the devices 102/104 internal clock up to a predefined resolution or precision (e.g., 100 microseconds of resolution, 10 microseconds of resolution, etc.).

The time-synchronization beacons 116 may take a period of time to build, such as creating a packet and/or frame that comprises the time-synchronization beacons 116. The devices 102/104 may be configured to determine an amount of time taken to build the time-synchronization beacons 116, and use that build time to determine an earliest transmission time. The devices 102/104 may determine the earliest time at which the time-synchronization beacons 116 may be transmitted based on the build time, and traditionally, the devices 102/104 would put timing information in the MAC-layer fields 118 that represents the earliest transmit time at which the time-synchronization beacons 116 can be transmitted, and cause a PHY layer to transmit the time-synchronization beacons 116 based on the earliest transmit time.

FIG. 1 illustrates transmission timing 120 for the devices 102/104 to transmit the time-synchronization beacons 116 according to techniques described herein. As illustrated, the devices 102/104 may determine an earliest transmission point 122 at which the time-synchronization beacons 116 can be transmitted. The earliest transmission point 122 may take into account a build time for a packet and/or beacon comprising the time-synchronization beacons 116. Traditionally, the devices 10/104 would simply populate the MAC-layer field(s) 118 with timing information indicating a time on the internal clock of the devices 102/104 based on the earliest transmission point 122. However, as noted above, the MAC-layer field(s) 118 have less precision or resolution such that the timing information may only indicate increments of, for example, 100 μs. Thus, the time-synchronization beacons 116 traditionally would be sent at any time within the time slot of the 100 μs, which may result in an inaccuracy of up to 99 μs (e.g., timing information indicates 300 μs and beacon is transmitted at 399 μs).

The devices 102/104 may be configured to implement a transmission delay 124 such that the devices 102/104 transmit the time-synchronization beacon 116 at an edge-of-field increment for the MAC-layer field(s) 118, or the actual transmission point 126 at T2. In this way, the MAC-layer field(s) 118 may be populated with timing information that indicates a time of an internal clock at, for example, 400 μs, and the MAC layer may instruct the PHY layer to transmit the time-synchronization beacon 116 at a time associated with 400 μs where the PHY layer transmits with greater precision than the resolution permitted by the MAC-layer field(s) 118. In this way, the receiving devices 102/104 may receive the time-synchronization beacons 116 at times that indicate the internal clock of the transmitting device within a resolution of the PHY layer. Stated otherwise, the 400 μs indicated in the MAC-layer field(s) 118 may be received by the receiving devices 102/104 with an accuracy of the PHY layer, such as 1 μs resolution or 10 μs resolution, and be used to update the internal clocks of the receiving devices 102/104. In this way, the communication devices in an AN 106 may synchronize their internal clocks with an accuracy or precision of the PHY layer (e.g., within 1 μs, within 10 μs, etc.), rather than the less precision of the MAC-layer field(s) 118 (e.g., up to 99 μs of resolution).

Figure 2:
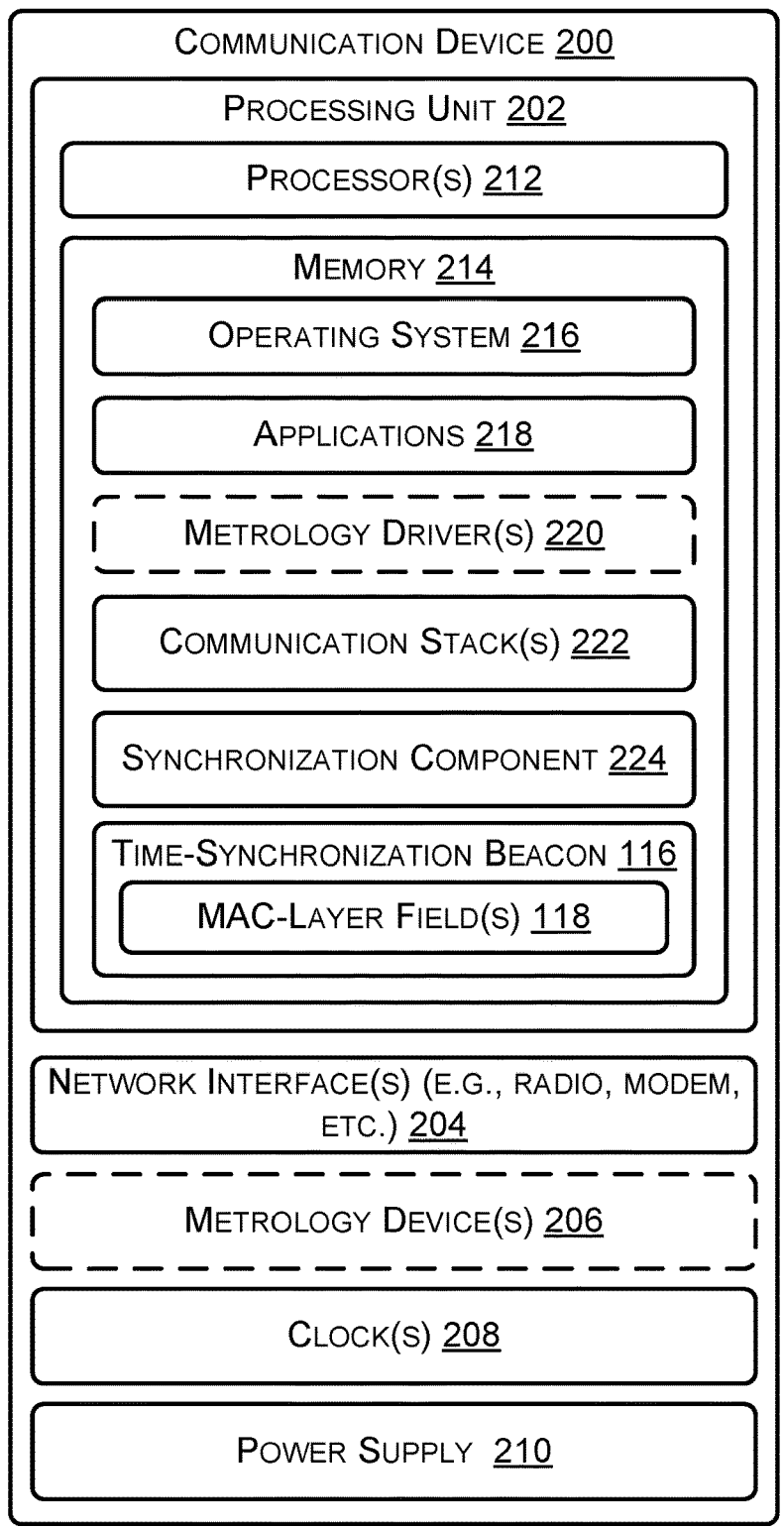
FIG. 2 illustrates a component diagram of an example communications device.

FIG. 2 illustrates a component diagram of an example communications device 200. The communications device may be an MPD 102, a BPD 104, and/or any other type of communication device 200 configured to communicate over a network (e.g., AN 106) with another device. As discussed above, the communication device 102 can take numerous different forms, depending on the industry and context in which they are deployed. Different types of communication devices 200 may have different physical and/or logical components. For instance, communication device 102 may comprise utility meter devices that have metrology components, whereas other types of communication device 102 may not. Thus, the metrology components are illustrated as boxed components to indicate that they are optional, depending on the type of communication device 102.

As shown in FIG. 2, the example communication device 200 includes a processing unit 202, one or more network interfaces 204 (e.g., transmitter, receiver, transceiver, power line communication module, etc.), one or more metrology devices 206 (optionally), and a power supply 210 (e.g., batter power supply, capacitor-based power supply, an alternating current (AC) power supply that couples to the AC mains power line wherein the communication device 200 is installed, etc.). In the example where the communication device 200 includes a batter power supply 210, the specific characteristics of the battery may vary widely depending on the type of communication device 200. By way of example and not limitation, the battery-based power supply 210 may comprise a Lithium Thionyl Chloride battery (e.g., a 3-volt battery having an internal impedance rated at 130 Ohms), a Lithium Manganese battery (e.g., a 3-volt battery having an internal impedance rated at 15 Ohms), a Lithium Ion battery, a lead-acid battery, an alkaline battery, and so on.

The processing unit 202 may include one or more processors 212 and memory 214. When present, the one or more processors 212 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or another hardware-based logic device.

The network interface(s) 204 may include a transceiver comprised of one or more hardware and/or software implemented radios to provide two-way RF communication with other network communication devices in the AN 106 and/or other computing devices via the network 110. The transceiver may additionally or alternatively include a modem to provide power line communication (PLC) communication with other network communication devices that are connected to an electrical service grid.

The metrology device(s) 206 comprise the physical hardware and sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to the one or more service providers 112 via the network interfaces 204. The consumption data may be formatted and/or packetized in a manner or protocol for transmission.

The memory 214 includes an operating system (OS) 216 and one or more applications 218 that are executable by the one or more processors 212. The memory 214 may also include one or more metrology drivers 220 (optionally) configured to receive, interpret, and/or otherwise process the metrology data collected by the metrology device(s) 206. Additionally, or alternatively, one or more of the applications 218 may be configured to receive and/or act on data collected by the metrology device(s) 206.

The communication device 200 may further include one or more internal clocks 208, such as a hardware clock or a real-time clock in the form of an integrated circuit, that keeps track of time for the communication device 200. The clock 208 may utilize a crystal oscillator, or power line frequency, to track time. The clock 208 may comprise any type of internal clock 208 utilized by computing devices.

The memory 214 may also include one or more communication stacks 222. In some examples, the communication stack(s) 222 may be configured to implement a 6LowPAN protocol, an 802.15.4e (TDMA CSM/CA) protocol, an 802.15.4-2015 protocol, an IPv6 Routing Protocol for Low-Power and Lossy Networks (RPL), and/or any other protocol. However, in other examples, other protocols may be used, depending on the networks with which the device is intended to be compatible. The communication stack(s) 222 describe the functionality and rules governing how the computing device 200 interacts with each of the specified types of networks. For instance, the communication stack(s) 222 may cause MPDs and BPDs to operate in ways that minimize the battery consumption of BPDs when they are connected to these types of networks.

In some instances, the communication device 200 may be configured to send or receive communications on multiple channels simultaneously. For example, the network interfaces 204 may be configured to receive data at the same time on hundreds of channels. Additionally, or alternatively, the network interface(s) 204 may be configured to send data at the same time on hundreds of channels.

Figure 3:
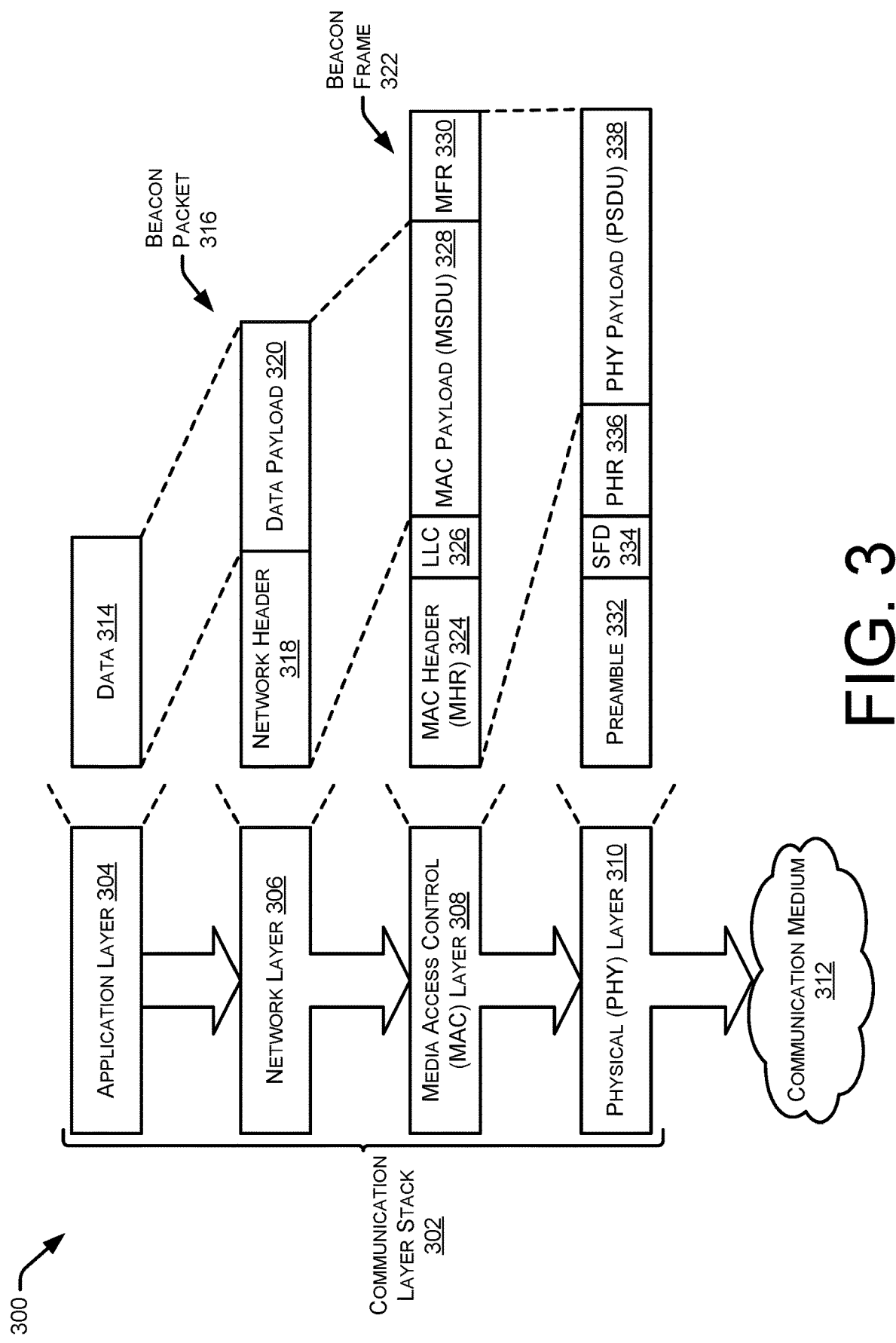
FIG. 3 illustrates a schematic diagram of an example time-synchronization beacon generated by a communications device.

In some examples, the communication stack(s) 222 may cause the communication device 200 to perform various communications that are defined by layers of a networking framework that implements communication protocols. For instance, network communication may be divided into various communication layers where the "upper layers" are concerned with application-level data (e.g., payloads), and the "lower layers" are concerned with packaging and transmitting data (e.g., MAC layer, PHY layer, etc.) Each layer in the networking framework may assign or divide the duties or networking into a stack such that control for communicating over a network is passed from one layer to the next, generally starting at the application layer and proceeding to the lowest layer which is generally the PHY layer. An example communication stack 222 is illustrated in FIG. 3, and also in FIG. 4.

The memory 214 may further store a synchronization component 224 configured to perform some, or all, of the communication techniques described herein. the synchronization component 224 may be included in, include, work in conjunction with, or otherwise be associated with the communication stacks 222 of the communication device 200. The synchronization component 224 may include logic or code that configures the communication device 220 to perform the timing synchronization techniques described herein, such as delaying transmission of a time-synchronization beacon 116 until an edge-of-field increment of the MAC-layer field(s) 118 of a time-synchronization beacon 116. Further, the memory 214 may store, at least temporarily the time-synchronization beacon 116 before transmission, and/or upon receipt from another communication device.

The memory 214 of the communication device 200 is shown to include software functionality configured as one or more "components." However, the components are intended to represent example divisions of the software for purposes of discussion, and are not intended to represent any type of requirement or required method, manner, or necessary organization. Accordingly, while various "components" are discussed, their functionality and/or similar functionality could be arranged differently (e.g., combined into a fewer number of components, broken into a larger number of components, etc.).

The various memories (e.g., memory 214) described herein are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable, and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain computing devices (e.g., the communication device 200) are described herein, it should be understood that those computing devices may include other components and/or be arranged differently. As noted above, in some instances a computing device may include one or more processors and memory storing processor executable instructions to implement the functionalities they are described as performing. Certain computing devices may additionally or alternatively include one or more hardware components (e.g., application specific integrated circuits, field programmable gate arrays, systems on a chip, and the like) to implement some or all of the functionalities they are described as performing.

By way of example and not limitation, the communication device 200 may implement a variety of modulation techniques and/or data rates, such as frequency-shift keying (FSK) 802.15.4g (e.g., mandatory mode with a data rate of 50 kbps or 75 kbps, no forward error correction; legacy mode with a data rate of 150 kbps with forward error correction code rate 1/2; option 2; etc.), offset quadrature phase-shift keying (OQPSK) modulation with direct-sequence spread spectrum (DSSS) spreading, and so on. To implement these different connection modes, a media access control (MAC) sub-layer of a device may be able to indicate to a physical layer the modulation technique and data rate to be used for each transmission.

FIG. 3 illustrates a schematic diagram 300 of an example time-synchronization beacon 116 generated by a communications device 200. As illustrated, the time-synchronization beacon 116 may be generated and communicated according to a communication layer stack 302 that is defined according to a communication protocol. The communication layer stack 302 includes multiple layers that pass down control over the generation/building of the time-synchronization beacon 116 until the time-synchronization beacon 116 is transmitted or sent over a physical medium.

The communication layer stack 302 may include an application layer 304, a network layer 306, a MAC layer 308, and a PHY layer 310 that ultimately transmits or sends the generated time-synchronization beacon 116 over a physical medium 312 (e.g., wired and/or wireless network). However, these layers are merely illustrative for the communication layer stack 302, and in other examples the communication layer stack 302 may include additional layers, less layers, different layers, and/or any combination of layers based on the communication protocol.

Generally, the application layer 304 is an abstraction layer that specifies the shared communications protocols and interface methods used by the communication devices 200 in a communications network 106. In some instances, the application layer 304 may comprise a user interface, or application interface, responsible for receiving data from outside sources (e.g., users, sensors, etc.), such as metrology devices. In some examples, the application layer 304 may designate the data 314, or payload, of the message being generated, such as a time-synchronization beacon 116.

The network layer 306 may be responsible for providing data regarding routing paths for network communication. Generally, the data 314 may be transferred in the form of packets via logical network paths in an ordered format controlled by the network layer 306. The network layer 306 may generate a beacon packet 316 that includes a network header 318 indicating transparent information about the transmission of the time-synchronization beacon 116, such as the address of the communication device that the time-synchronization beacon 116 is being transmitted to. In some examples, the network header 318 may further indicate the address of the transmitting device 200.

The MAC layer 308 may be utilized to generate a beacon frame 322 for the time-synchronization beacon 116. The MAC layer 308 may be responsible for moving data packets from one network interface card (NIC) to another NIC across a network 106 or other shared channel. The MAC layer 308 may provide addressing and channel access control mechanisms. The beacon frame 322 may contain information about the network 106, and include a MAC header (MHR) 324 that indicates a type of the beacon frame 322, and a source and destination address for the beacon frame 322. Further, the MAC header 324 includes a field that stores timing information for storing time synchronization usable by receiving devices. The field of the MAC header 324 that stores the timing information may only be permitted to store timing information up to a protocol-defined resolution or precision. The beacon frame 322 may optionally include an LLC header 326, the MAC payload (MSDU) 328 that is the subject of the beacon frame 322, and the MFR 330 (or FCS).

In some examples, a layer other than the MAC layer 308 may be responsible for generating and processing beacon frames 322. For instance, any layer above the PHY layer 310 (as a service to the upper layer) may utilized to perform the techniques described herein for generating and processing beacon frames 322. For instance, the timing field/information may be carried by the network layer 306 and/or other upper layers, in some examples.

The MAC layer 308 may pass the beacon frame 322 to the PHY layer 310. The PHY layer 310 may include the circuitry required to implement physical layer functions. The PHY layer 310 may connect a link layer (e.g., MAC layer 308) to a physical medium 312, such as optical fiber, copper cable, power lines, and/or a non-physical medium, such as radio frequency channels. The PHY layer may include a chip that implements the hardware send and receive function for the time-synchronization beacon 116, and interfaces between the analog domain according to the modulation for the communication protocol. The PHY layer 310 may translate the beacon frame 322 into a signal (e.g., AC signal representing bits) that are communicated over the communication medium 312 using, for example, a transmitter. In some examples, the PHY layer 310 may transmit a preamble 332, SFR 334, PHR 336 and PHY payload (PSDU) 338, as is known in the art.

It should be understood that the communication layer stack 302 is merely illustrative, and any stack with additional layers, different layers, and/or less layers may be utilized to perform the techniques described herein. For example, the communication layer stack 302 may simply include the physical layer 310 and one other layer (e.g., network layer 306, MAC layer 308, etc.) on its own to perform the timing techniques described herein. In some examples, the techniques may be performed by a single upper layer in conjunction with the physical layer 310, or be performed by multiple upper layers working together to perform the timing techniques using the physical layer 310.

As described in more detail below, the hand-off of the beacon frame 322 from the MAC layer 308 to the PHY layer 310 may be delayed until a time associated with an edge-of-field resolution increment of the MAC-layer field(s) 118 that stores timing information.

Figure 4:
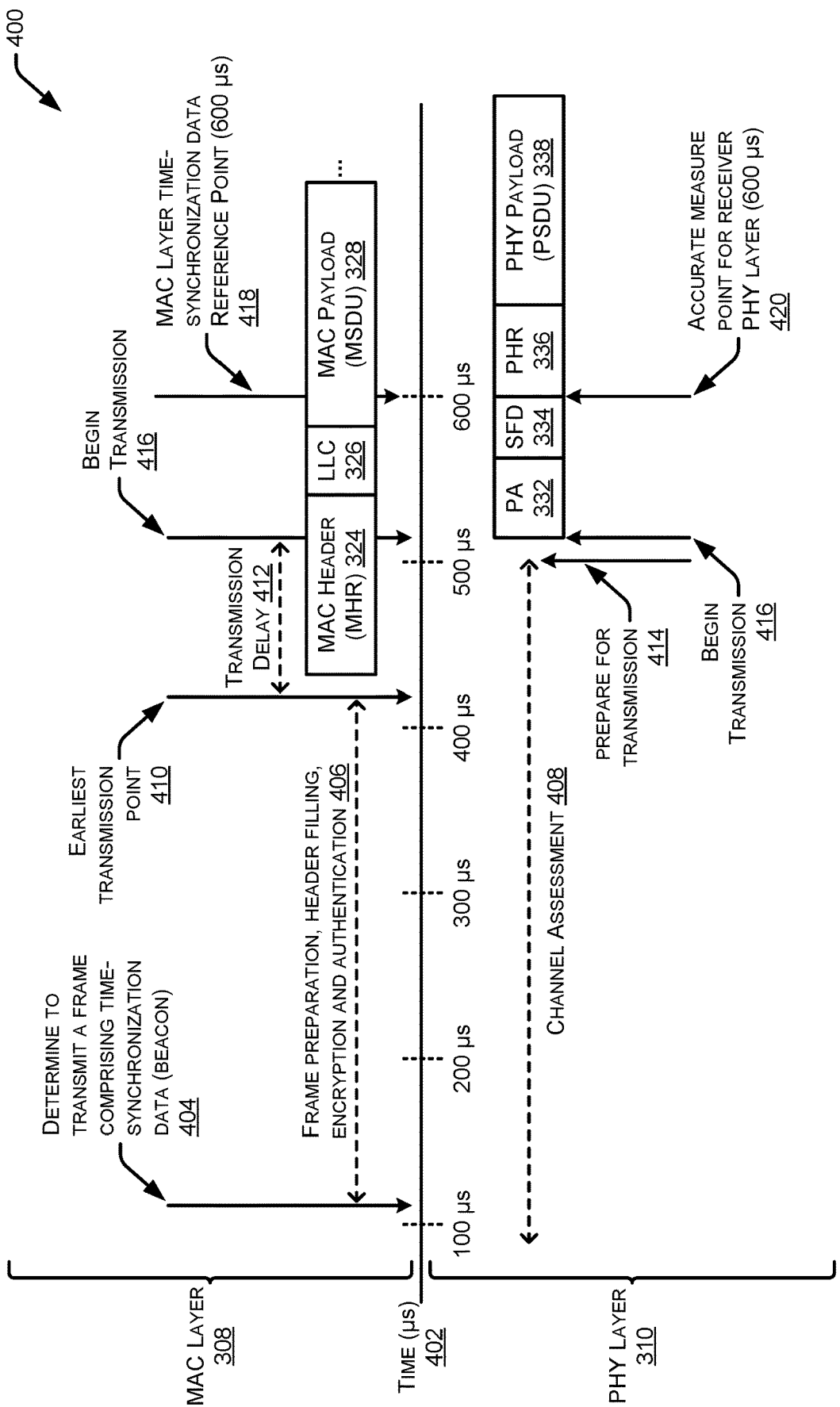
FIG. 4 illustrates a timing diagram of an example beacon that has its transmission time delayed according to the techniques described herein.

FIG. 4 illustrates a timing diagram 400 of an example beacon 116 that has its transmission time delayed according to the techniques described herein. the timing diagram 400 illustrates various operations or events occurring over time 402 with respect to microseconds (µs) indicated by an internal clock 208 of a communication device 200. The timing diagram 400 illustrates a hand-off of a beacon frame 322 from a MAC layer 308 to the PHY layer 310.

At 404, the MAC layer 308 may determine to transmit the beacon frame 322 comprising time-synchronization data (e.g., time-synchronization beacon 116). For instance, the MAC layer 308 may determine that a predefined period of time has elapsed (as defined by the governing communication protocol) indicating that the communication device 200 is to synchronize its internal clock with neighboring communication devices. as another example, the communication device 200 may have received a time-synchronization beacon 116 from a neighboring communication device, and determine to continue synchronizing other neighboring communication devices in the area network 106.

After determining to transmit the beacon frame 322, the MAC layer 308 may, at 406, begin building the beacon frame 322 (and the beacon packet 316 if performed by the MAC layer 308). For instance, the MAC layer 308 may begin frame preparation, header filling, encryption, and authentication. In some instances, building/preparing the beacon frame 322 may take various amounts of time, such as a few hundred microseconds, or up to a millisecond in some examples. Further, the PHY layer 310 may be performing channel assessment at 408 to listen and determine whether there is activity on the channel, or if there is not activity and the communication device 200 can transmit on the channel.

While the beacon frame 322 is being created or generated, the MAC layer 308 may take a snapshot of the time information via the internal clock 208 at the communication device 200. Traditionally, the MAC layer 308 may populate the MAC-layer field 118 with timing information associated with the earliest transmission point 410. For instance, the MAC layer 308 may have traditionally input timing information indicating "400 µs" in the MAC-layer field 118 and cause the PHY layer 310 to transmit the beacon frame 322 during the period of time between 400 µs and 500 µs. However, the actual transmission time may end up being up to 499 µs, which results in inaccuracies when synchronizing internal clocks of communication devices 200 on a network 106. This may result in a communication device 200 synchronizing their internal clock off from another communication device 200 by almost 100 µs, which may in turn continue to perpetuate inaccuracies throughout the network. As an example, if 5 devices in a row all synchronize with each other with an inaccuracy of 99 µs, then the final device may be off by nearly 400 µs from the first device.

According to the techniques described herein, the MAC layer 308 may implement a transmission delay 412 from the earliest transmission point 410 to beginning transmission 416. The MAC layer 308 may instruct the PHY layer 310 (e.g., calling a PHY API) to begin transmission, and the PHY layer may prepare for transmission at 414 and being transmission at 416 of a signal that represents the time-synchronization beacon 116 (e.g., beacon frame 322). The MAC layer 308 may have populated the MAC layer field 118 with timing information that corresponds to the MAC-layer time-synchronization data reference point 418 of 600 µs. In some examples, this reference point may be an accurate measure point for receiving PHY layers 420 when they timestamp received signals. Stated otherwise, a receiver can accurately measure, at a PHY layer, the reception of a signal representing a time-synchronization beacon 116 at 420, or just before the PHY header 336.

Thus, the accurate measure point 420 may indicate a time at which a receiving device can detect (and/or timestamp) the time-synchronization beacon 116. Thus, determining a time at which to send the signal by the PHY layer 310 may be based at least in part on this measuring point 420 associated with the receiving device accurately receiving the signal.

Accordingly, the MAC layer 308 may populate the MAC-layer field 118 with timing information that indicates 600 µs. In some examples, to determine the time to populate the MAC-layer field 118 with, the MAC layer 308 may calculate, estimate, or otherwise take into account (i) a build time for preparing the beacon frame 322, (ii) an amount of time taken by the PHY layer to prepare for and begin transmission, and (iii) the accurate measure point for the receiver PHY layer 420 to detect the signal (e.g., transmitted beacon frame 322).

In this way, when a receiving device detects or receives a time-synchronization beacon 116, the receiving device may timestamp the reception time, which may correspond to a time associated with the beginning of the PHY header 336. Further, the receiving device may analyze the time-synchronization beacon 116 and determine the timing information in the MAC-layer field 118. To synchronize the internal clock, the receiving device may compare and determine a difference between the timestamp for reception of the time-synchronization beacon 116, the timing information listed in the MAC-layer field 118, and take into account delay for transmission (e.g., time to transmit over a network 106, jitter in the network 106, etc.). Using this information, and potentially other information, the receiving device may more accurately update their internal clock to more accurately correspond to the transmitting device using the precision of the PHY layer, as opposed to precision of the MAC-layer field 118 of the transmitting device.

Figure 5:
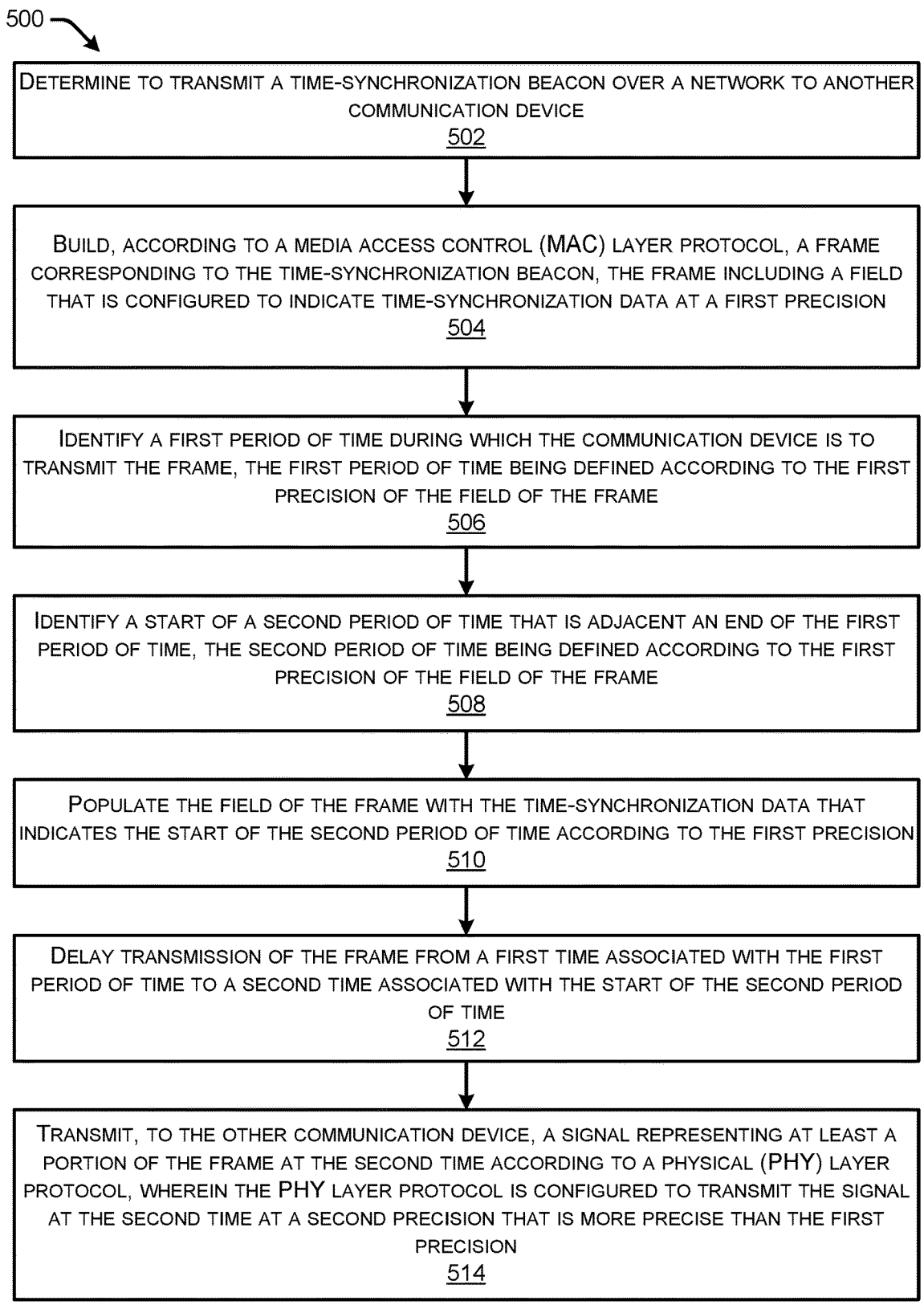
FIG. 5 is a signal flow diagram which illustrates an example process for a communication device to transmit a time-synchronization beacon over a network at an edge-of-field resolution of a MAC layer packet.
Figure 6:
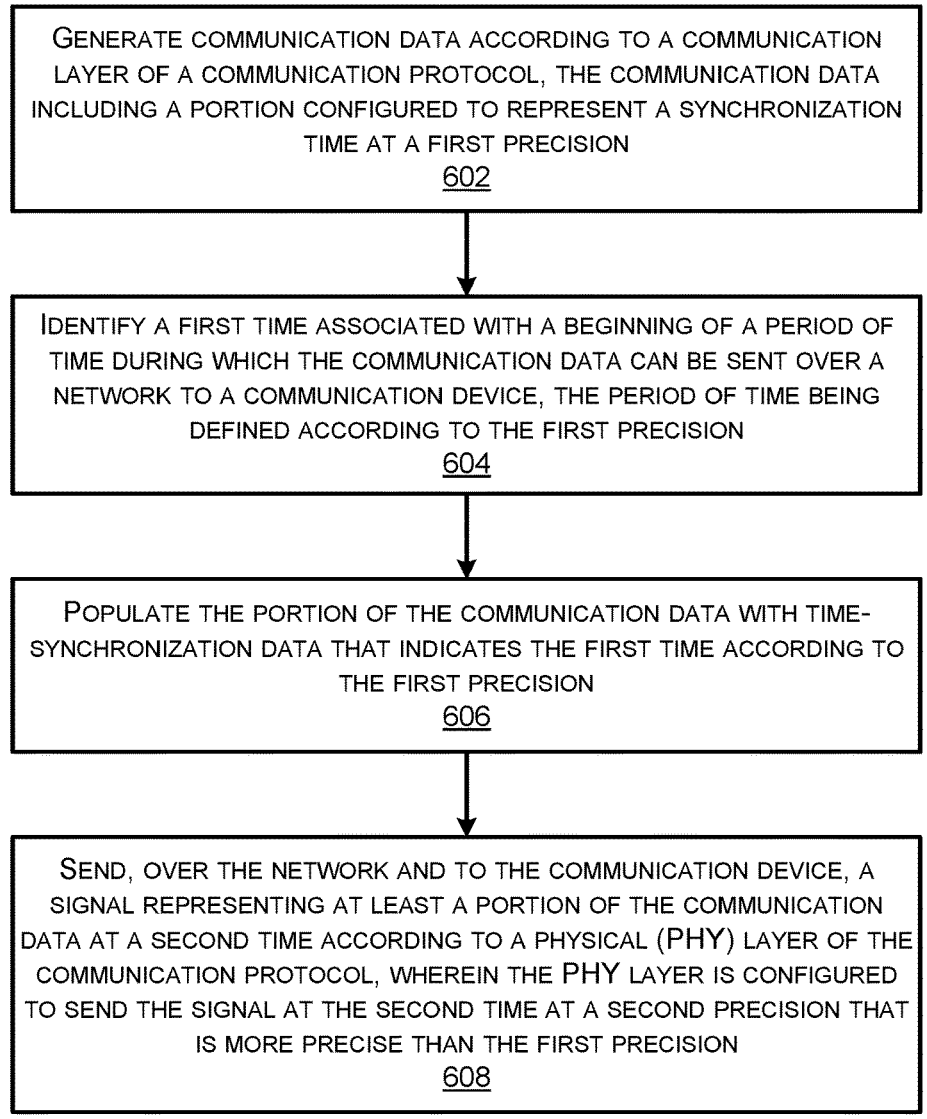
FIG. 6 illustrates an example process for sending communication data to a communication device that indicates a synchronization time.

FIGS. 5 and 6 illustrate example processes 500 and 600 for employing the techniques discussed herein. For ease of illustration the processes 500 and 600 may be described as being performed by a device described herein, such as the devices 102/104 and/or communication device 200. However, the processes 500 and 600 may be performed by other devices or systems of devices. Moreover, the devices may be used to perform other processes.

The processes 500 and 600 (as well as each process described herein) are illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

FIG. 5 is a signal flow diagram which illustrates an example process 500 for a communication device 200 to transmit a time-synchronization beacon 116 over a network 106 at an edge-of-field resolution of a MAC-layer beacon frame 322.

At 502, the communication device may determine to transmit the time-synchronization beacon 116 over the network to another communication device. For instance, the communication device 200 may have determined that a predefined period of time has elapsed from a last time that a time-synchronization beacon 116 was sent.

At 504, the communication device 200 may build, according to a media access control (MAC) layer protocol, a frame 322 corresponding to the time-synchronization beacon 116. In some examples, the frame 322 includes a field 118 that is configured to indicate time-synchronization data at a first precision.

At 506, the communication device 200 may identify a first period of time during which the communication device 200 can transmit the frame 322. For instance, the MAC layer 308 may determine a build time associated with building the frame 322, and/or a time required by the PHY layer 310 to transmit. The first period of time may be defined according to the first precision of the field of the frame 322. For instance, the first period of time may span a period of time defined by the first precision (e.g., 100 microseconds).

At 508, the communication device 200 may identify a start of a second period of time that is adjacent an end of the first period of time. For instance, the communication device may identify the second period of time that begins after the first period of time (e.g., 600 microseconds). In some examples, the second period of time may be directly adjacent the end of the first period of time (e.g., the next period of time), or have other periods of time spaced between depending on the transmission delay 412. Generally, the second period of time may also be defined according to the first precision of the field of the frame 322.

At 510, the communication device 200 may populate the field 118 of the frame 322 with the time-synchronization data that indicates the start of the second period of time according to the first precision (e.g., during the frame preparation phase 406).

At 512, the communication device 200 may delay transmission of the frame 322 from a first time associated with the first period of time to a second time associated with the start of the second period of time. For instance, the MAC layer 308 may implement the transmission delay 412 such that the frame 322 does not begin transmission at the earliest transmission point 410 (e.g., the first time), but instead begins transmission at the second time (e.g., begin transmission 416).

At 514, the communication device 200 may transmit, to the other communication device, a signal representing at least a portion of the frame 322 at the second time according to a physical (PHY) layer protocol. For instance, the PHY layer 310 may begin transmission at the second time (e.g., begin transmission 416) wherein the PHY layer protocol is configured to transmit the signal at the second time at a second precision that is more precise than the first precision.

In some examples, the first precision according to which the field is configured to indicate the time-synchronization data is on an order of one hundred microseconds, the first period of time and the second period of time each span one hundred microseconds, and the second precision according to which the PHY layer is configured to transmit the signal is on an order of at least one of a microsecond or ten microseconds. Further, in some examples, the first precision according to which the field is configured to indicate the time-synchronization data is in a range of 40 to 250 microseconds, and the second precision according to which the PHY layer is configured to transmit the signal is in a range of 1 microsecond to 10 microseconds.

FIG. 6 illustrates an example process 600 for sending communication data to a communication device that indicates a synchronization time.

At 602, a communication device 200 may generate communication data according to a communication layer of a communication protocol, the communication data including a portion configured to represent a synchronization time at a first precision. In some examples, the communication data comprises a frame, a packet, and/or any other message or data structure to be transmitted over a network. The communication layer may be any layer, or layers, that are above the physical layer in a communication protocol (e.g., MAC layer, network layer, application layer, etc.)

At 604, the communication device 200 may identify a first time associated with a beginning of a period of time during which the communication data can be sent over a network to a communication device. For instance, the communication device 200 may identify the MAC layer time-synchronization data reference point 418. In some examples, the period of time being defined according to the first precision.

At 606, the communication device 200 may populate the portion of the communication data with time-synchronization data that indicates the first time according to the first precision.

At 608, the communication device 200 may send, over the network and to the communication device, a signal representing at least a portion of the communication data at a second time according to a physical (PHY) layer of the communication protocol, wherein the PHY layer is configured to send the signal at the second time at a second precision that is more precise than the first precision.

In some examples, the techniques of method 600 may further include receiving, from a second computing device and over the network, additional communication data, identifying, from the additional communication data, additional time-synchronization data. Further, the method 600 may include performing at least one of updating an internal clock of the first computing device using the additional time-synchronization data, or storing the additional time-synchronization data. In examples where the additional time-synchronization data is stored for further use, the time-synchronization data may be used to maintain or track precise relative time synchronization differences to other peer devices in the network 106 for layer information exchanges. In this way, the internal clock may, or may not, be updated depending on the example, but the time-synchronization data may be utilized to track precise relative time synchronization differences between devices 102/104 in the network 106.

As described herein for the process 600, the communication layer may comprise a media access control (MAC)

layer, the portion of the communication data comprises a field of a frame that is generated according to the MAC layer, and the field of the frame that is populated with the time-synchronization data is included in a MAC header of the frame.

Although the disclosure describes embodiments having specific structural features and/or methodological acts, it is to be understood that the claims are not necessarily limited to the specific features or acts described. Rather, the specific features and acts are merely illustrative some embodiments that fall within the scope of the claims of the disclosure.

What is claimed is:

1. A method of operating a communication device to transmit a time-synchronization beacon over a network, the method comprising:

determining to transmit the time-synchronization beacon over the network to another communication device;

building, according to a media access control (MAC) layer protocol, a frame corresponding to the time-synchronization beacon, the frame including a field that is configured to indicate time-synchronization data at a first precision;

identifying a first period of time during which the communication device is to transmit the frame, the first period of time being defined according to the first precision of the field of the frame;

identifying a start of a second period of time that is adjacent an end of the first period of time, the second period of time being defined according to the first precision of the field of the frame;

populating the field of the frame with the time-synchronization data that indicates the start of the second period of time according to the first precision;

delaying transmission of the frame from a first time associated with the first period of time to a second time associated with the start of the second period of time;

transmitting, to the other communication device, a signal representing at least a portion of the frame at the second time according to a physical (PHY) layer protocol, wherein the PHY layer protocol is configured to transmit the signal at the second time at a second precision that is more precise than the first precision.

2. The method of claim 1, wherein:

the first precision according to which the field is configured to indicate the time-synchronization data is in a range of 40 to 250 microseconds.

3. The method of claim 2, wherein the second precision according to which the PHY layer is configured to transmit the signal is in a range of 1 microsecond to 10 microseconds.

4. The method of claim 1, further comprising identifying a build time associated with building the frame, wherein identifying the first period of time during which the communication device is to transmit the frame is based at least in part on the build time.

5. The method of claim 1, wherein the field of the frame that is populated with the time-synchronization data is included in a MAC header of the frame.

6. A computing device comprising:

one or more processors;

one or more computer-readable media storing computer-executable instructions that, when executed by the one or more processors, cause the one or more processors to perform operations comprising:

generating a frame according to a media access control (MAC) layer protocol, the frame including a field that is configured to represent a synchronization time at a first resolution;

identifying a first time associated with a beginning of a period of time at which the computing device is to send the frame over a network to a communication device, the period of time being defined according to the first resolution;

populating the field of the frame with time-synchronization data that indicates the first time according to the first resolution; and sending, over the network and to the communication device, a signal representing at least a portion of the frame at a second time according to a physical (PHY) layer protocol, wherein the PHY layer protocol is configured to transmit the signal at the second time at a second resolution that is more precise than the first resolution.

7. The computing device of claim 6, wherein the period of time comprises a first period of time, the operations further comprising:

identifying a second period of time during which the computing device is to transmit the frame; and delaying sending of the frame from the second period of time to the second time.

8. The computing device of claim 7, wherein a start of the first period of time is adjacent an end of the second period of time.

9. The computing device of claim 6, the operations further comprising determining the second time at which to send the signal based at least in part on a measuring point associated with the communication device receiving the signal.

10. The computing device of claim 6, wherein:

the first resolution according to which the field is configured to indicate the synchronization time is in a range of 40 to 250 microseconds.

11. The computing device of claim 10, wherein the second resolution according to which the PHY layer is configured to transmit the signal is in a range of 1 microsecond to 10 microseconds.

12. The computing device of claim 6, wherein the field of the frame that represents the synchronization time is included in a MAC header of the frame.

13. A system comprising:

one or more processors;

one or more computer-readable media storing computer-executable instructions that, when executed by the one or more processors, cause the one or more processors to perform operations comprising:

generating communication data according to a communication layer of a communication protocol, the communication data including a portion configured to represent a synchronization time at a first precision;

identifying a first time associated with a beginning of a period of time during which the communication data is to be sent over a network to a communication device, the period of time being defined according to the first precision;

populating the portion of the communication data with time-synchronization data that indicates the first time according to the first precision; and sending, over the network and to the communication device, a signal representing at least a portion of the communication data at a second time according to a physical (PHY) layer of the communication protocol, wherein the PHY layer is configured to send the signal at the second time at a second precision that is more precise than the first precision.

14. The system of claim 13, wherein:
the communication layer comprises a media access control (MAC) layer; and
the portion of the communication data comprises a field of a frame that is generated according to the MAC layer.

15. The system of claim 14, wherein the field of the frame that is populated with the time-synchronization data is included in a MAC header of the frame.

16. The system of claim 13, wherein the one or more processors and the one or more computer-readable media are included in a first computing device, the operations further comprising:
receiving, from a second computing device and over the network, additional communication data;
identifying, from the additional communication data, additional time-synchronization data; and
performing at least one of:
updating an internal clock of the first computing device using the additional time-synchronization data; or
storing the additional time-synchronization data.

17. The system of claim 13, further comprising identifying a build time associated with generating the communication data, wherein identifying the first time associated with the period of time at which the communication device is to send the communication data is based at least in part on the build time.

18. The system of claim 13, wherein:
the first precision at which the portion of the communication data represents the synchronization time is in a range of 40 to 250 microseconds.

19. The system of claim 18, wherein the second precision according to which the PHY layer is configured to send the signal is in a range of 1 microsecond to 10 microseconds.

20. The system of claim 13, wherein the period of time comprises a first period of time, the operations further comprising:
identifying a second period of time during which the communication data is to be sent; and
delaying sending of the communication data from a third time associated with the second period of time to the second time.

* * * * *